(12) United States Patent
Enyedy et al.

(10) Patent No.: US 10,007,284 B2
(45) Date of Patent: Jun. 26, 2018

(54) SCALABLE VARIABLE ENERGY POWER SOURCE

(71) Applicant: LINCOLN GLOBAL, INC., City of Industry, CA (US)

(72) Inventors: Edward A. Enyedy, Eastlake, OH (US); Adam Hruska, Chardon, OH (US)

(73) Assignee: LINCOLN GLOBAL, INC. CA (US)

( * ) Notice: Subject to any disclaimer, the term of this patent is extended or adjusted under 35 U.S.C. 154(b) by 722 days.

(21) Appl. No.: 14/507,118

(22) Filed: Oct. 6, 2014

(65) Prior Publication Data

US 2016/0098051 A1 Apr. 7, 2016

(51) Int. Cl.
| | |
|---|---|
| *H02J 17/00* | (2006.01) |
| *H02J 5/00* | (2016.01) |
| *H01M 10/42* | (2006.01) |
| *G05F 1/625* | (2006.01) |
| *H02J 7/00* | (2006.01) |
| *B23K 9/10* | (2006.01) |
| *H02J 7/14* | (2006.01) |
| *H01M 10/48* | (2006.01) |
| *H02J 7/24* | (2006.01) |
| *H01M 10/6563* | (2014.01) |
| *H01M 10/6567* | (2014.01) |
| *H01M 10/66* | (2014.01) |
| *H02J 1/06* | (2006.01) |
| *H01M 10/63* | (2014.01) |
| *H01M 10/46* | (2006.01) |

(52) U.S. Cl.
CPC ............ *G05F 1/625* (2013.01); *B23K 9/1006* (2013.01); *H01M 10/486* (2013.01); *H01M 10/6563* (2015.04); *H01M 10/6567* (2015.04); *H01M 10/66* (2015.04); *H02J 7/0052* (2013.01); *H02J 7/1415* (2013.01); *H02J 7/1492* (2013.01); *H02J 7/247* (2013.01); *H01M 10/46* (2013.01); *H01M 10/63* (2015.04); *H02J 1/06* (2013.01)

(58) Field of Classification Search
CPC ... G05F 1/625; H01M 10/66; H01M 10/6567; H01M 10/6563; H01M 10/486; H01M 10/46; H01M 10/63; H02J 7/247; H02J 7/1492; H02J 7/1415; H02J 7/0052; H02J 1/06; B23K 9/1006; B23K 9/1075; B23K 9/1043; B23K 9/1081
See application file for complete search history.

(56) References Cited

U.S. PATENT DOCUMENTS

| | | | | |
|---|---|---|---|---|
| 2011/0206948 | A1* | 8/2011 | Asai | H01M 2/0473 429/7 |
| 2012/0148890 | A1* | 6/2012 | Goto | H01M 2/1077 429/90 |
| 2014/0030936 | A1* | 1/2014 | Sandoval | H01R 24/38 439/866 |
| 2015/0083700 | A1* | 3/2015 | Burkhart | B23K 9/1006 219/133 |

* cited by examiner

*Primary Examiner* — Jared Fureman
*Assistant Examiner* — Rafael Pacheco
(74) *Attorney, Agent, or Firm* — Carlos Garritano; Evan Perry

(57) ABSTRACT

A scalable power source that includes a controller that is electrically connected to an engine component that generates electrical power and includes a modular connector that electrically connects the controller to plural auxiliary power sources or plural types of auxiliary power sources to provide a selected power output.

20 Claims, 6 Drawing Sheets

SCALABLE VARIABLE ENERGY POWER SOURCE

TECHNICAL FIELD

The present invention generally relates to a power source having an engine component and a scalable auxiliary power component.

SUMMARY OF THE INVENTION

The present invention generally provides a scalable power source that includes a controller that is electrically connected to an engine component that generates electrical power and includes a modular connector that electrically connects the controller to plural auxiliary power sources or plural types of auxiliary power sources to provide a selected power output. According to a further aspect of the invention, the power source is connected to an implement and provides the selected power thereto. According to another aspect of the invention, the implement is a welding torch or plasma cutter.

The present invention further provides a power source including an engine component adapted to generate electrical power; a power controller in communication with the engine component, wherein the power controller receives electrical power from the engine component; a housing encompassing the engine component and the power controller; an auxiliary power source electrically connected to the controller by a modular connector, the modular connector including a power connection adapted to transmit electrical power from the auxiliary power supply to the power controller; the modular connector further including an identification assembly adapted to provide identification information from the auxiliary power supply to the power controller, wherein the power controller controls electrical power from engine component and the auxiliary power source to generate a selected electrical current or voltage output.

The present invention further provides a power source including an engine component adapted to generate electrical power, the engine component including a radiator and a fan, wherein a heat transfer fluid is circulated through the radiator by a pump operatively attached to the engine component, wherein the fan is driven by the engine component; a controller in communication with the engine component, pump and fan, wherein the controller receives electrical power from the engine component; a housing encompassing the engine component and the power controller; the housing including a receiver adapted to receive at least one auxiliary power source; a modular connector on the housing, the modular connector including a power connection adapted to transmit electrical power from the at least one auxiliary power source to the controller; the modular connector further including an identification assembly adapted to provide identification information from the at least one auxiliary power source to the controller, the identification information including at least one of a auxiliary power source type, electrical current, voltage, or power capacity, and storage capacity of the at least one auxiliary power source; wherein the controller controls electrical power from engine component and the auxiliary power source to generate a selected electrical current or voltage output based on the identification information.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION OF THE INVENTION

As used herein, spatially orienting terms such as "above," "below," "upper," "lower," "inner," "outer," "right," "left," "vertical," "horizontal," "top," "bottom," "upward," "downward," "laterally," "upstanding," et cetera, can refer to respective positions of aspects as shown in or according to the orientation of the accompanying drawings. "Inward" is intended to be a direction generally toward the center of an object from a point remote to the object, and "outward" is intended to be a direction generally away from an internal point in the object toward a point remote to the object. Such terms are employed for purposes of clarity in describing the drawings, and should not be construed as exclusive, exhaustive, or otherwise limiting with regard to position, orientation, perspective, configuration, and so forth.

Figure 1:
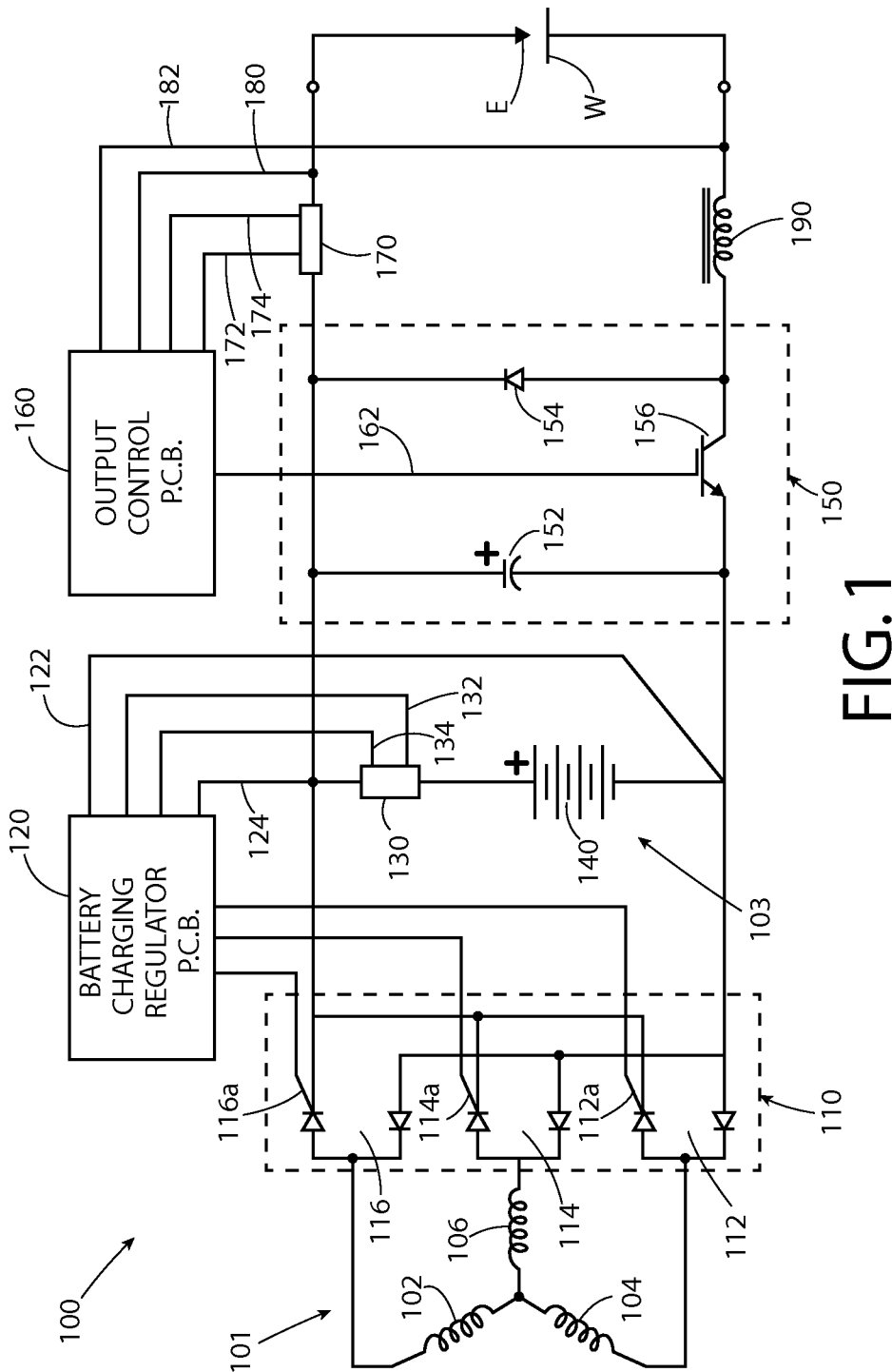
FIG. 1 is partially schematic view of a hybrid electrical power source according to the invention.
Figure 2:
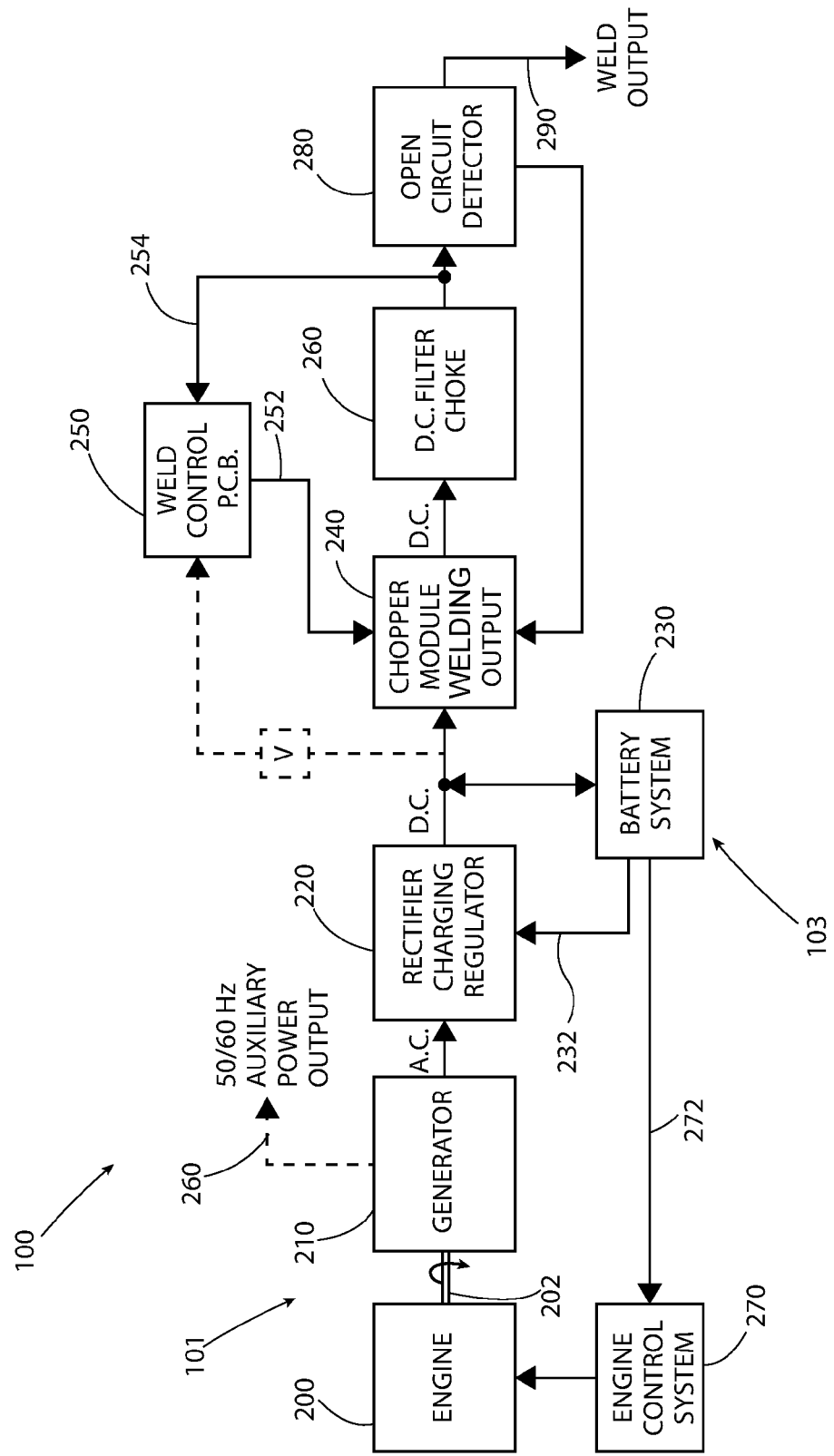
FIG. 2 is a block diagram of hybrid electrical power source according to the invention.

Referring now to FIGS. 1 and 2 wherein the showings are for the purpose of illustrating the preferred embodiments only and not for the purpose of limiting same, there is illustrated an electric arc welder that includes a power source. The power source of the present invention can be substituted for most, if not all, power sources currently used in engine welders, plasma cutter, generators, and the like. These are powered by a gasoline powered or a diesel powered engine used to drive an electric generator that creates an electrical current. This current may be used in a number of applications by connecting an implement I (FIG. 6) such as a welding torch, a plasma cutter, a soldering iron, a brazing torch, an ultrasonic machining tool, and a laser.

For example, when implement I is a welding torch, the current is used to form an electric arc during a welding procedure. The size of the engine and electric generator used in the engine welder is dependent on the maximum power rating of the engine welder. The engine and electric generator used in prior engine welders must be of sufficient magnitude to supply the maximum power rating of the engine welder at any time, irrespective of the type of duty cycle of a particular welding operation. As a result, these past engine welders, which had a high power rating, included large engines and electric generators to generate the rated power for the engine welder. The power source of the present invention is designed to provide large power ratings for an electric arc welder without having to use large engines and electric generators as presently required.

The power source of the present invention utilizes two different power sources to provide the needed power for an electric arc. One power source is a rechargeable battery power source. The other power source is typically an engine driven electric generator. For purposes of describing this embodiment of the invention, the power source only includes two power sources; however, it can be appreciated that additional power sources can be used. In addition, an engine driven electric generator is used in this particular embodiment; however, it will be appreciated that other or additional non-battery power sources can be used. In the welding example discussed, the power source is designed to have an output rating of at least about 100 amperes to power a medium or heavy duty welder. Other selected output ratings may be appropriate for other applications or the number or types of implements connected to the power source.

A variety of electrical wiring diagrams can be used for practicing the present invention; however, one embodiment is illustrated in FIG. 1. The non-battery power source of welder A is an electric generator 100 having a plurality of output windings 102, 104, 106. The AC current generated by the electric generator is rectified by a rectifier bridge 110 that includes a line frequency switching network which includes three sets of SCRs 112, 114, 116 that are controlled by gate leads 112 a, 114 a, 116 a.

The rectified current is directed to a battery charging regulator 120 used to monitor and control the charging of battery 140. The battery charging regulator receives a signal from the battery current feed back sensor 130 via lines 132, 134 to determine how much current is flowing into and/or from the battery. The battery current feed back sensor 130 is typically designed to monitor the flow of current to and from the battery. When the battery current feed back sensor senses the flow of current from the battery, the battery current feed back sensor will send a signal to the battery charging regulator that the battery is currently supplying current to form an electric arc between electrode E and workpiece W. While the battery is supplying current to the electric arc, the battery charging regulator can be designed such that no charging of the battery occurs. When the battery is not supplying current to the electric arc, the battery charging regulator can be designed to direct rectified current from the electric generator to the battery to recharge the battery. As can be appreciated, the current from the electric generator can be directed to electrode E when an electric arc is being generated. As can also be appreciated, the current from the electric generator can be directed to the battery even when an electric arc is being generated. The battery charging regulator can be designed to monitor or receive information concerning the charge level of the battery via lines 122, 124 and to regulate current to the battery to maintain sufficient charge.

As shown in FIG. 1, the current from battery 140 is directed to a chopper 150 which is used to generate the desired waveform of the welding current. The chopper includes a standard capacitor 152, diode 154 and switch 156 that is controlled by weld output control 160 via line 162. A weld output control 160 is used to control the chopper based on the current information received from current sensor 170 via lines 172, 174 and/or a voltage signal via lines 180, 182. A DC filter in the form of a choke 190 is used to smooth out the welding current to facilitate in obtaining the desired waveform for the welding current.

The operation of one embodiment of the invention is illustrated by the block diagram of FIG. 2. As illustrated in FIG. 2, engine 200 drives the electric generator 210 via a drive shaft 202. The electric generator generates an AC current which is rectified by the rectifier charging regulator 220. As illustrated in FIG. 2, electric generator 210 also can supply power to an auxiliary power output 260 for AC current. In addition, the AC current from generator 210 can be rectified and be partially directed to an auxiliary DC power output, not shown. The DC current from rectified charger regulator 220 may be directed into battery system 230 to charge the battery when a feedback signal 232 indicates that the battery needs to be and/or is available for charging. The DC current supplied from the battery of battery system 230 is directed into a chopper module welding output 240 which is used to form the desired current waveform during an arc welding process. The DC current from the rectified charge regular 220 can also be directly fed in the chopper module welding output 240. As such the DC current from the rectified charge regular 220 can be used to only charge battery system 230 or be used to both charge battery system 230 and supply current to chopper module welding output 240.

An engine control system 270 is provided to control the operation of engine 200. The engine control system receives a signal via line 272 from the battery system, which signal is representative of the charge on the battery system. When the battery system is fully charged, the engine control system slows or turns off engine 200. When the battery system is less than fully charged and/or below a predefined charge level, the engine control system causes the engine to increase in speed and/or be turned on.

Weld control 250 controls the chopper welding output via signal 252 based upon output current information received via line 254. FIG. 2 also illustrates that weld control 250 can additionally receive voltage information from the DC current being directed from battery system 230 to chopper module welding output 240. The DC current from the chopper welding output is directed into a DC filter choke 260 to smooth out the DC current used for forming the welding arc.

An open circuit detector 280 is provided to determine whether an arc is being formed or is about to be formed between the electrode and workpiece during a welding operation. When open circuit detector 280 does not detect an arc, the open circuit detector causes the chopper module 240 to turn off, thereby reducing a drain of power from the battery system. In one non-limiting design, the voltage level between the workpiece and electrode is monitored to determine the current state of the arc.

As illustrated in FIG. 2, all the current directed to the weld output is supplied by battery system 230. In order for the battery system 230 to supply the total current to the weld output 290, the size of the battery system is selected to have an adequate amp-hour size which can supply the maximum power rating of the welder for a sufficient period of time. Typically, the duty cycle for most manual stick welding is about 20-40%. As a result, during a period of about 10 minutes, an electric arc is generated for only two to four minutes. The size and amp rating of the battery system 230 may be sufficient to at least supply a full amount of power to the electric arc during this duty cycle in order to obtain a proper electric arc during an arc welding process. Alternatively, power from generator and battery may be applied in tandem to supply sufficient power to the electric arc during the duty cycle. During the time that an electric arc is not generated, the rectifier charging regulator 220 directs DC current into battery system 230 to recharge the depleted battery system. Typically, the amp-hour size of the battery is selected so as to provide the arc welding requirements for the maximum welding output rating of the welder for at least about one minute, and typically about 5-45 minutes. In alternate embodiments described below, a power controller combines power from the engine component and an auxiliary power source such as a battery to provide the current voltage, or power output needed for a given application.

As can be appreciated from the design and operation of the power source, the size of engine 200 and electric generator 210 need not be sized to provide the maximum welding output rating of the welder. The size of engine 200 and electric generator 210 only needs to be sufficiently sized to provide enough current to the battery of battery system 230 to adequately recharge the battery after the battery has been partially discharged when forming an electric arc. For instance, if the maximum welding output rating of a welder is 10 kW of power, and the maximum average duty cycle for a welding operation is 40%, the engine and electric generator only needs to produce sufficient current to supply 40% of the maximum welding output rating since only this much current is being discharged by the battery system during a particular duty cycle for the welder. As a result, the size of the engine and the size of the electric generator can be significantly decreased by using the power source of the present invention. According to another aspect of the invention, the power output of the power supply may be scaled up or down or otherwise varied by changing the type or number of batteries connected to the controller. In addition to the cost savings associated with using a smaller engine and electric generator, the efficiency rating for the use of the current generated by the electric generator is significantly increased since most of the current is used to recharge the battery after it has been partially discharged during the formation of an electric arc. In the past, only 20-40% of the current generated by the electric generator was used in welding operations when the duty cycle was about 20-40%, In addition to the increase in energy usage efficiency, the size of the motor needed to provide sufficient power to meet the maximum welding output rating of the welder is decreased since a smaller engine is needed to power the power source. Another benefit of the power source is the ability of the welder to generate a welding current without having to operate engine 200 and electric generator 210. When battery system 230 is fully charged, the battery system has an adequate amp-hour size to provide the welding arc requirements during a particular period of time. As a result, the welder can be used in locations where the running of an engine powered welder is unacceptable due to noise and/or engine exhaust issues.

Figure 3:
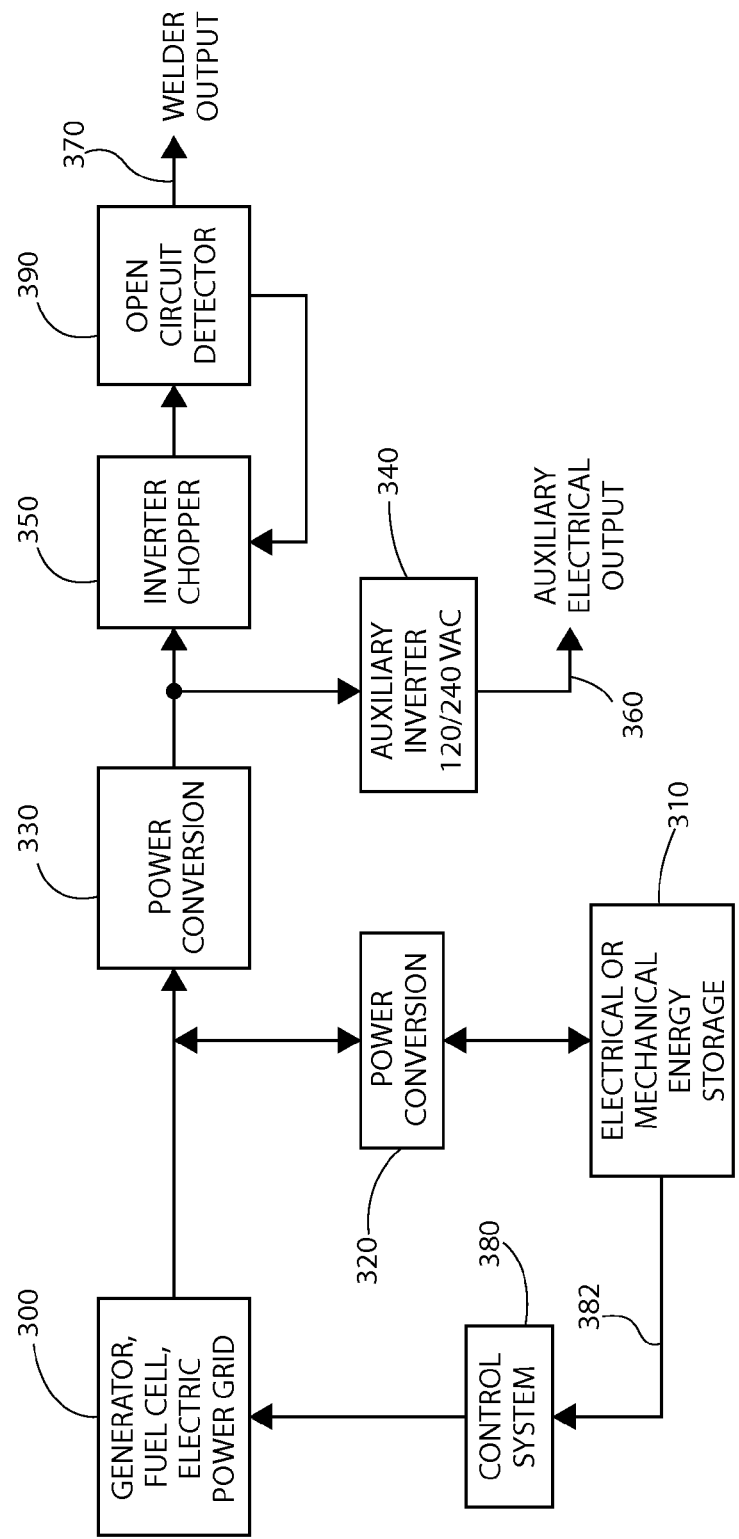
FIG. 3 is a block diagram of a hybrid electrical power source according to another embodiment of the invention.

Referring now to FIG. 3, there is illustrated a welder which is powered by battery system and a non-battery system such as a fuel cell system, an electric generator, an electric power grid and/or the like. When a plurality of fuel cells are used as the non-battery system, the fuel cells are typically stacked together. A buck circuit and/or a boost-buck circuit may be provided to increase the voltage of the fuel cell system. Any number of fuel cell types can be used. Typically, a proton exchange membrane fuel cell is used; however, this is not required. When an electric power grid is used as the non-battery source, the electric power grid is typically an electric outlet or plug that is supplied power by a local or regional power grid system. When a generator is used as the non-battery source, the electric generator is typically an engine power generator as described above with respect to FIG. 2; however, this is not required. As can be appreciated more than one or type of non-battery source can be used to supply current to the welder.

The battery power source of the welder is illustrated as the electrical and mechanical energy storage 310. Typically, the electrical and mechanical energy storage system is made up of one or more rechargeable batteries; however, the electrical and mechanical energy storage system may include or alternatively be a capacitor, an inductor, and/or a fly wheel. Connected to the electrical and mechanical energy storage 310 is a power conversion circuit 320. Power conversion circuit 320 converts the power between an AC current and a DC current. As can be appreciated, if the electrical and mechanical energy storage 310 consists essentially of rechargeable batteries, power conversion circuit 320 could be eliminated. The current flowing from the fuel cell electric power grid and/or the electrical and mechanical energy storage is directed into a power conversion circuit 330. Similar to the power conversion circuit 320, power conversion circuit 330 converts the current from a DC source to an AC source. It can be appreciated that power conversion circuit 320 can be eliminated if a DC current is to be directed to inverter chopper circuit 350. As shown in FIG. 3, the welder can include an auxiliary electrical output 360 that can be used to provide electrical power to various types of devices that are plugged into the welder. Auxiliary inverter 340 can be used to modify current from a DC current to an AC current and/or modify the voltage level of the line voltage to be a 120 and/or 240 line voltage source to be sent to the auxiliary electrical output 360.

A control system 380 is provided to control the operation of or the current being provided by the non-battery source 300. The control system receives a signal via line 382 from the electrical and mechanical energy storage system, which signal is representative of the charge or energy level of the electrical and mechanical energy storage system. When the electrical and mechanical energy storage system is fully charged, the control system slows or turns off the generator or fuel cell and/or disengages the power grid from the welder. When the electrical and mechanical energy storage system is less than fully charged and/or below a predefined charge level, the control system causes the fuel cell or generator to turn on and/or generate more current, and/or reengages the power grid with the welder.

The current flowing from power conversion circuit 330 is directed into inverter chopper circuit 350 which is used to form the current waveform of the electric arc. The current waveform from the inverter chopper 350 is directed to welder output 370 for use in forming a weld bead on a workpiece.

An open circuit detector 390 is provided to determine whether an arc is being formed or is about to be formed between the electrode and workpiece during a welding operation. When open circuit detector 390 does not detect an arc, the open circuit detector causes the inverter chopper 350 to turn off, thereby reducing a drain of power from the non-battery power system. In one non-limiting design, the voltage level between the workpiece and electrode is monitored to determine the current state of the arc.

In one non-limiting configuration of the welding system illustrated in FIG. 3, the electrical and mechanical energy storage 310 is designed so as to provide the peak energy demand of the welder when the electric arc is formed between an electrode and a workpiece to form a weld bead. A fuel cell is sized and designed to generate a sufficient amount of power over a period of time so as to recharge the electrical and mechanical energy storage device 310 during the time that an electric arc is not being generated by the welder.

In one embodiment, power source 100 includes an engine component and an auxiliary power component 400 that connect to power controller C to provide a selected power, current, or voltage output. Auxiliary power component 400 includes one or more auxiliary power sources 405. Auxiliary power source 405 may be a battery, fuel cell, capacitor flywheel and the like. Power source 100 is made scalable by providing an auxiliary power component that is readily interchanged to change the type of alternative power source, or provides modular connectivity to add or subtract auxiliary power source to achieve a desired output or other characteristic. For example, auxiliary power source may be a battery. The battery may be any commercially available battery or custom battery that provides a selected current voltage or power output including but not limited to NiMH, NiCd, Li-ion, Li-polymer, bead acid and the like. According to the invention, power source may be provided with a first battery of a first type providing a first output. To change the overall output of the power source, a second battery having a different output may be substituted for the first battery or connected to controller C in tandem with first battery to achieve the desired output. Similarly, it may be desirable to substitute or add batteries of a different type while maintaining the same output. For example, batteries of different types may be desirable to take advantage of optimum discharge capacities/rates or storage capacities/rates inherent in different battery types. For example, batteries of different types react differently with temperature. Therefore, depending on the ambient temperature, one type of battery may provide a superior discharge/storage capacity than another. To facilitate the flexibility of connecting different types or combinations of batteries, auxiliary power sources include an auxiliary power source housing that includes at least a portion of a modular connect 500 described below. Auxiliary power component includes an auxiliary power source identifier assembly, generally indicated by the number 425. Identification assembly 425 provides identifying information to the main power controller C including a characteristic of the auxiliary power source 400 including at least one of the current, voltage, or power capacity, the storage capacity, or the type of energy source connected to the system. Identification assembly 425 may include an identification sensor 430 that detects the type or characteristic of auxiliary power source or a signal provided from the energy source to identify itself, or a mechanical system that identifies the energy source by the physical connection of the energy source to the system.

Identification assembly 425 is connected to a controller C and provides various information regarding the auxiliary power source 405 including but not limited to the type of power source, such as a battery, fuel cell etc; the operating characteristics for the source, and expected output. The identification information may also identify the particular type of power source being connected. For example, in the context of batteries, a NiCd battery may be distinguished from a Lithium-ion battery or other chemical composition. Alternatively, identification may include identifying an operating characteristic of the auxiliary power supply such as a current or voltage rating. For example, identification component 425 may identify whether a 50 amp/hr or 100 amp/hr auxiliary power source has been attached. Identification component 425 may include a sensor 430 adapted to detect a particular type or characteristic of auxiliary power source or be a sense lead 435 that receives identifying information from the auxiliary power source 405 and communicates it to the controller C. Identification sensor 430 may include an electrical component that detects information about the power source 405 by electrically connecting to the auxiliary power source 405. Alternatively, a mechanical sensor may be used to detect the physical characteristics identifying a particular power source 405. For example, in the context of batteries, commercially available lead acid, nickel cadmium (NiCd), Nickel metal hydride (NiMH) batteries Lithium-ion (Li-ion) or lithium ion polymer (Li-ion polymer) batteries have distinct profiles. To that end, identification sensor 430 may include a bracket, bay or other first receiver 441 that is sized or contoured to receive a first type of battery and a second receiver 442 that is sized or contoured to receive a second type of battery where the first and second batteries are different from each other. The batteries may be different from each other in the type of battery used, or they may be the same type of battery but have different energy capacity, storage capacity, or other operating characteristics.

Figure 4:
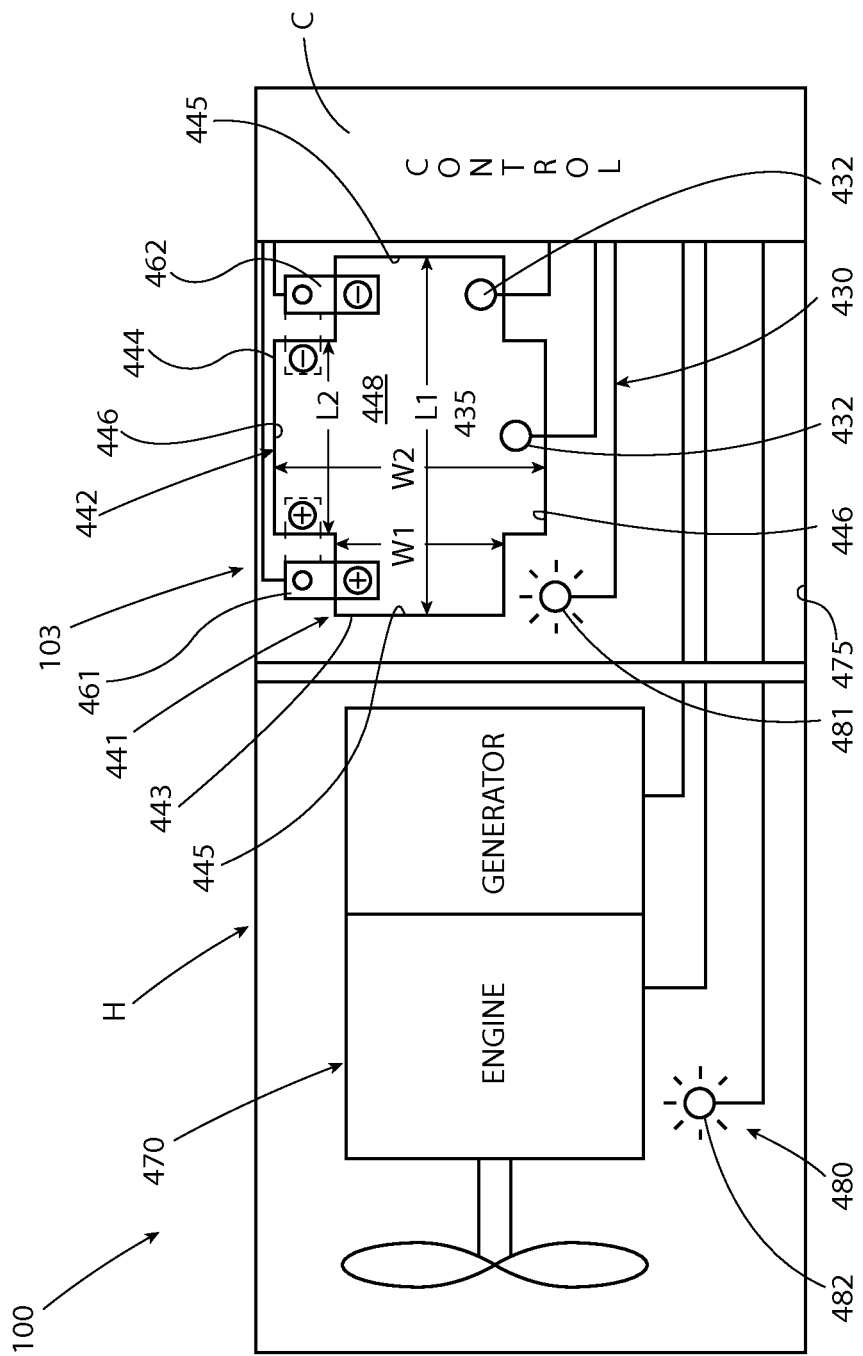
FIG. 4 is a partially schematic view of a hybrid electrical power source according to the invention showing details of a modular auxiliary power source connection.

Power source 100 includes a modular connector 450 adapted to intermediately receive auxiliary power sources of differing types. Modular connector 450 electrically connects the auxiliary power sources through a common connector, generally indicated at 455, to controller C. In addition, modular connector may include the identification assembly 425. In the example shown in FIG. 4, modular connection assembly 450 receives two different types of batteries. In particular, modular connector 450 includes a first receiver 441 receiving a NiCd battery and second receiver 442 receiving a Lithium-ion battery. As shown, first receiver 441 is a rectangular receiver having a first length L1 and a first width W1. Second receiver 442 has a second length L2 and a second width W2. Both receivers are shown as having a rectangular contour but other contours (443, 444) may be used depending on the profile of the first and second batteries. In the example shown, the contours are based on commercially available NiCd and Lithium-ion batteries. The NiCd battery has a larger profile with a greater width than the lithium ion battery. To that end, first receiver 441 includes first end walls 445 that are sized to receive the width of the NiCd battery and are spaced from each other by the first length L1 to accommodate the length of the NiCd battery. Second end walls 446 in second receiver are sized to accommodate the relatively narrow profile of the lithium ion battery. It will be understood, that first and second receivers may be formed separately from each other. In the example shown, the receivers are formed in a common location within the housing and share an overlapping space 448. The first and second receivers are oriented in different directions to allow for this overlap and to help the user differentiate between the type of battery being used. In the example shown, first receiver 441 is perpendicular to second receiver 442.

According to another aspect of the invention, an auxiliary power source identifier assembly 425 is provided. Identifier assembly 425 includes an identification 430 sensor that detects/receives identifying information about a type or characteristic of auxiliary power source(s) 405 being used. In the example shown in FIG. 4, identification sensor 430 includes a pair of pressure switches 431, 432 associated uniquely with each receiver. A first pressure switch 431 is located at the base of first receiver 441 in a position outside of the overlapping space 448. A second pressure switch 432 is located in the base of second receiver 442 outside of the overlapping space 448. In this way, when a NiCd battery is placed within first receiver 441, the battery rests on first pressure switch 431 sending a signal to controller C indicating that a NiCd battery is being used. Similarly, when a lithium ion battery is placed in second receiver 442, the battery activates second pressure switch 432 to send a signal to controller C that a lithium ion battery is being used. Other sensors may be used to determine the type of battery within the receivers without relying on the unique contour of the receivers.

According to another aspect of the invention, modular connector 450 includes a common set of electrical connections to connect to the battery regardless of which receiver it is located in. For example, positive and negative connections 461, 462 may be provided at one end of the auxiliary power receiver to reach the terminals on either battery when located in their respective receiver. For example, a connection that moves to contact or attach to the battery terminals including but not limited to battery cables or rotating connector (shown) may be used. The orientation of the connectors shown is not limiting as other orientations may be needed to accommodate the configuration of the terminals on the battery.

Based on the identification of the auxiliary power source 405, controller C, may vary the operating characteristics of the power source 100 to maximize at least one performance characteristic of the system. For example, different types of batteries may provide optimum energy capacity or optimum energy storage capacity within different operating temperature ranges. For example, NiCd or NiMH batteries have fairly broad operating temperature ranges (−40 C to 100 C) with relatively steady discharge rates across the range, while Li-ion batteries have a fairly broad operating temperature range (−20 C-140 C), but tend to provide optimum discharge capacity at higher temperatures. In terms of service life, most batteries achieve optimum service life if used at 20 C or slightly below. Nickel based batteries degrade rapidly when cycled at high ambient temperatures. To that end, based on the battery chemistry being used, controller C may alter performance of the engine driven component 470 or condition the space 475 in which the batteries are located to attempt to maintain the battery at an optimum temperature for a desired performance characteristic. For example, if a great degree of discharge capacity is needed for a short period of time, controller C may elevate the temperature within housing to optimize the temperature based on the discharge capacity of the battery(ies) connected to the system. If longevity is the greater concern, the controller may attempt to maintain the ideal 20 C operating temperature. Alternatively, based on the battery information and the ambient temperature information, controller may determine the discharge capacity of the battery and vary the balance of energy obtained from the engine component based on the expected discharge capacity of the battery. For example, if the temperature is ideal for the battery component, the output from the engine driven component may be reduced or excess energy may be diverted to charge the battery. Contrastingly, if the temperature is in a range where lower discharge capacity will be provided, the engine driven component may be operated at higher rate to generate additional power and make up for any deficit from the battery component. The same alterations may be made with other types of auxiliary power sources and, therefore, the discussion of battery components is not limiting.

To obtain temperature feedback, one or more temperature sensors 480 may be used. In the example shown, a first temperature sensor 481 monitors the temperature near auxiliary power component 400, and a second temperature sensor 482 monitors temperature engine component 470.

Figure 5:
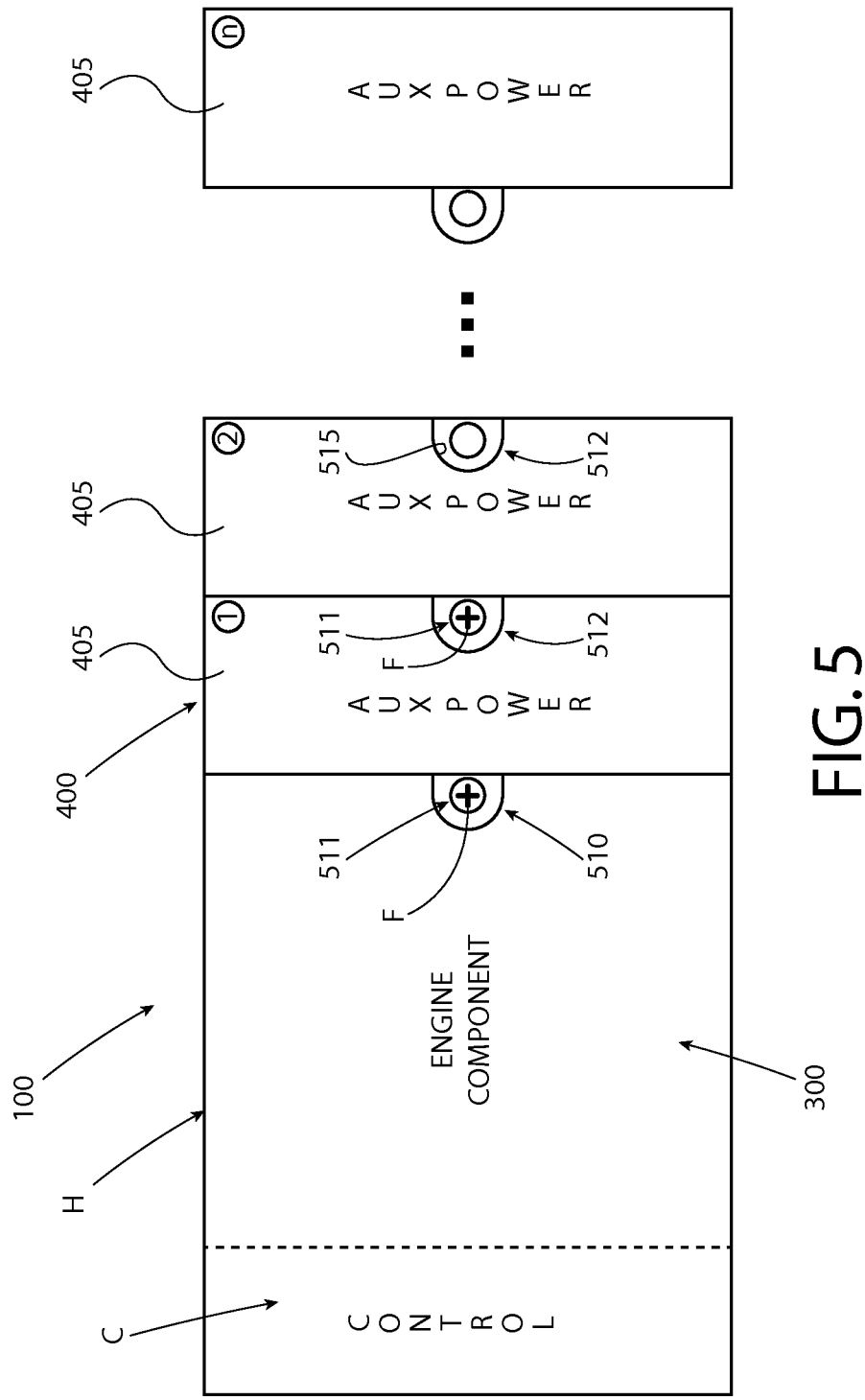
FIG. 5 is partially schematic view of a hybrid electrical power source according to the invention.
Figure 6:
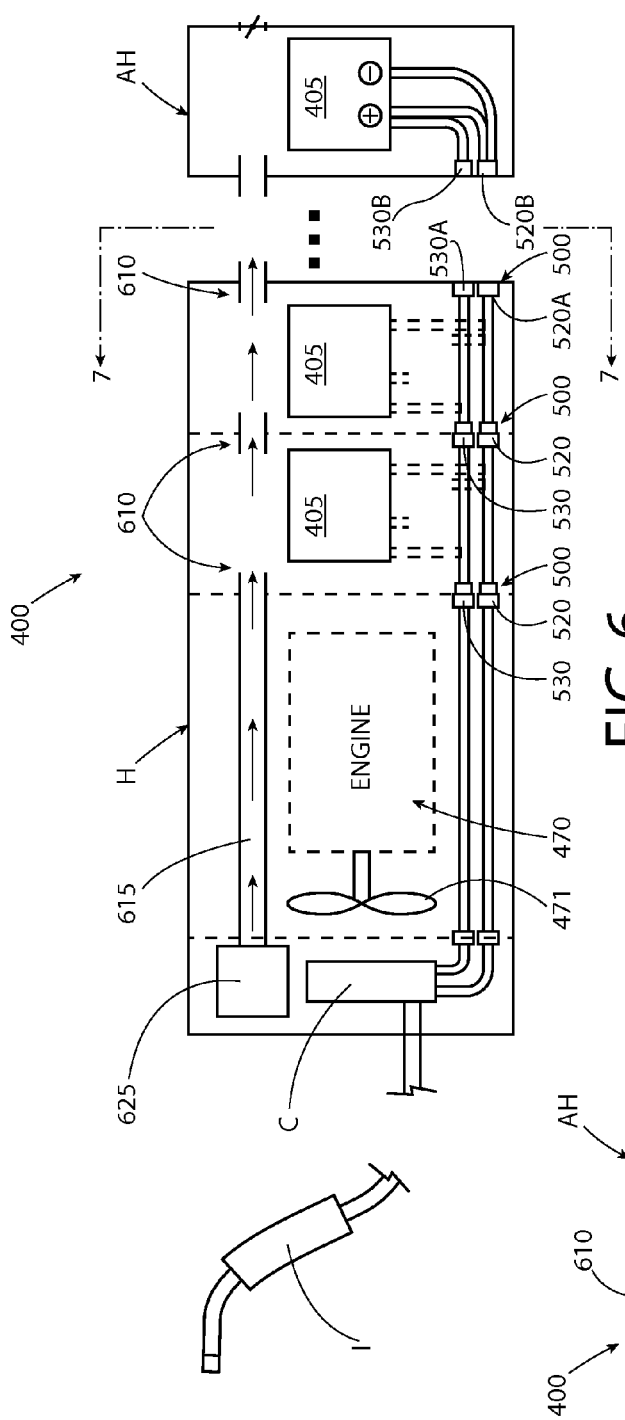
FIG. 6 is a partially schematic view similar to FIG. 5 showing details of the electrical and fluid connections within the hybrid electrical power source.
Figure 7:
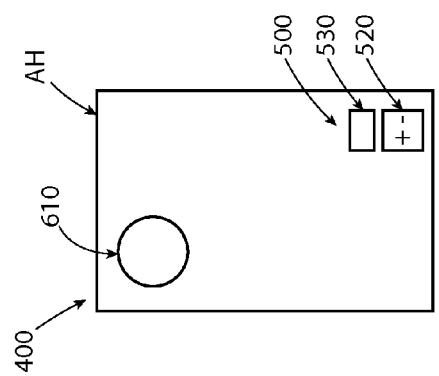
FIG. 7 is a side elevational view as might be seen along line 7-7 in FIG. 6 showing further details of the connectors of the hybrid electrical power source.

According to another aspect of the present invention, the power source 100 is scalable. One embodiment of a scalable power source 100, as shown in FIGS. 5-7, includes an engine driven component with one or more auxiliary power source components connected thereto. Power source includes a controller that provides common control of the engine driven component and any auxiliary power source component. In this way additional auxiliary power source components may be connected to the power source to scale the amount of energy provided by the power source. For example, a power source having an engine driven component 300 and first auxiliary power component 400 may provide a first power output. To increase the power output, a second auxiliary power source may be connected to the power source to provide a second power output that is greater than the first.

In accordance with one embodiment of the invention, power source 100 includes a housing H that includes a modular connector 500 adapted to interchangeably connect one or more auxiliary power sources 405 to controller C. Modular connector 500 may be used to connect to an external power source, or, as shown, it may connect an auxiliary power component 400 within or on the housing H so that it may be moved with the engine driven component as a unit. Auxiliary power component 400 may include one or more auxiliary power sources 405, such as a battery, capacitor, fuel cell etc. In the example shown, auxiliary power source 405 includes a battery. Battery may include any commercially available battery or custom battery including but not limited to lead acid, nickel cadmium (NiCd), nickel metal hydride (NiMH), lithium-ion (Li-ion) or lithium ion polymer (Li-ion polymer) batteries. As shown in FIGS. 5-6, auxiliary power component 400 may include any number of auxiliary power sources 405 (Aux Power 1, 2, . . . N) may be attached to housing H.

Each auxiliary power source 405 may include a first connector 511 that allows it to attach to housing and a second connector 512 that provides a point of attachment for a subsequent auxiliary power source. According to one embodiment of the invention, as shown, a first auxiliary power source is provided within or attached to housing H. A first connector 511 used to attach first auxiliary power source to housing H may include a tab 513 that overlies a portion of housing H and is attached to housing H by a fastener F. Fastener F may include but is not limited to mechanical fasteners, such as bolts, screws, detents and the like, an adhesive, weld, or custom fastener. Connector 510 may include a receiver 515, such as a recess, notch, opening and the like, on the housing or adjacent auxiliary power source that receives at least a portion of the tab to improve the fit between the components. As discussed, plural auxiliary power sources 405 may be connected to controller C to obtain a desired power output or other characteristic. A modular connector 500 is provided on auxiliary power component 400 to facilitate interchanging the auxiliary power source 405 or attaching additional power sources 405. Modular connector 500 includes electrical connections to electrically connect the auxiliary power source(s) 405 to the controller C. These connections may be provided as part of the mechanical connector or separate electrical connections may be provided as shown. In the example shown, modular connector 500 includes a power connection 520 and a sense connection 530, where the power connection 520 conveys power to/from the auxiliary power source 405 and the sense connection 530 receives the identification information from the auxiliary power source 405 and may be used to convey control signals to the auxiliary power source 405. As best shown in FIG. 6, the power connection 520 and sense connection 530 may include two halves indicated by the letters A and B that fit together to form the connection. For example, first half 520A of power connection 520 may include a female receiver that receives a male second half 520B of power connection 520. The halves each have conductors that provide the electrical connections. Similarly, first half 530A of sense connector 530 may be a female receiver and second half 530B of sense connection 530 may be male connector providing the sense connection when coupled. It will be understood that the male and female halves may be reversed or another suitable type of connection may be used. The connections shown provide physical as well as electrical connection between adjacent components. It will be understood that separate mechanical connections may be used and the halves limited to providing the electrical connection. For simplicity the halves are indicated by reference numeral and the electrical wiring to the halves is shown in the detached power source 405 at the far right of the figure. The same connections/wiring could be used on each auxiliary power source 405 or component 400 to make them interchangeable. In the example shown, positive and negative terminal connections are routed to the power connector 520 while the sensor wire is routed to the sense connection 530

Optionally, fluid connections, generally indicated at 610, may be provided between housing H and auxiliary power sources 405 to allow heat transfer fluid to be circulated through auxiliary power sources. As best shown in FIGS. 6 and 7, fluid connections 610 may be any type of conduit including a cuff or collar that fits into an opening formed on the housing and extends into a corresponding opening formed in the auxiliary power source. Alternatively, fluid connections may simply include openings in the power source housing (FIG. 7) that align with a corresponding opening in an adjacent power source or act as a vent when no adjacent source is present.

Auxiliary power source housing AH may have a second opening to fluidly connect to additional auxiliary power sources. A heat transfer fluid 615 is provided by a heat transfer source 620 which may simply be a vent that draws ambient air for heating or cooling purposes, or a conduit that draws heated air from the engine component 470. In some instances, engine component 470 may include a fan 471 and/or a radiator that can act as the heat transfer fluid source. The radiator may include a pump that is driven off of the engine component to circulate heat transfer fluid including but not limited to air, refrigerant, water or other fluids through the radiator. The controller C may connect to the fan and pump to control circulation of the heat transfer fluid to maintain a desired temperature within the housing or otherwise around the auxiliary power source.

Alternatively, a separate heat transfer fluid source may be provided. For example, a cooling fan 625 may be selectively operated by controller C to maintain the auxiliary power source(s) in a desired temperature range. Controller may operate fan 625 based on ambient temperature feedback or sensor feedback from within the housing or power sources or based on ambient temperature. The sensor feedback may be conveyed along the identification electrical connection (sense connector 530) or a separate temperature sensor connection may be provided as part of the modular connector 500. As a further alternative, each auxiliary power source may include its own fan or other heat transfer source to control its operating temperature. These heat transfer sources could operate independently based on temperature feedback to an on board temperature controller, or be connected to the power controller C through a suitable wired/wireless connection to allow the controller C to maintain a desired temperature within each auxiliary power source.

In the example shown in FIG. 6, heat transfer fluid in the form of air is provided by a fan 625 in communication with atmospheric air through an inlet. Air from fan 625 is pumped through a conduit 635 in housing H to auxiliary power sources 405. Fluid connectors 610 are provided to fluidly connect adjacent power sources 405 and located just above the power source 405 to take advantage of convection currents generated by power sources 405. The last power source connected includes a vent 640 that may optionally include a valve 645, such as a flap, sliding or rotating closure, louvers or the like, to selectively open or close the power sources 405 to the outside atmosphere.

Although the subject innovation has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (e.g., enclosures, sides, components, assemblies, etc.), the terms (including a reference to a "means") used to describe such elements are intended to correspond, unless otherwise indicated, to any element which performs the specified function of the described element (e.g., that is functionally equivalent), even though not structurally equivalent to the disclosed structure which performs the function in the herein illustrated exemplary embodiment or embodiments of the innovation. In addition, while a particular feature of the innovation may have been described above with respect to only one or more of several illustrated embodiments, such feature may be combined with one or more other features of the other embodiments, as may be desired and advantageous for any given or particular application. Although certain embodiments have been shown and described, it is understood that equivalents and modifications falling within the scope of the appended claims will occur to others who are skilled in the art upon the reading and understanding of this specification.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed:

1. A power source comprising:
   an engine component adapted to generate electrical power;
   a power controller in communication with the engine component, wherein the power controller receives electrical power from the engine component;
   a housing encompassing the engine component and the power controller;
   an auxiliary power source electrically connected to the power controller by a modular connector, the modular connector including a power connection adapted to transmit electrical power from the auxiliary power supply to the power controller;

the modular further including an identification assembly adapted to provide identification information from the auxiliary power supply to the power controller, wherein the power controller controls electrical power from engine component and the auxiliary power source to generate a selected electrical current or voltage output.

2. The power source of claim 1, wherein the auxiliary power source is a battery.

3. The power source of claim 2, wherein the power controller may route electrical power from the engine component to the battery to recharge the battery.

4. The power source of claim 1 further comprising a second auxiliary power source connectable to the power controller via the modular connector, wherein the power controller controls electrical power from the engine component, auxiliary power source and second auxiliary power source to generate the selected electrical current or voltage output.

5. The power source of claim 1, wherein the modular connector is housed within the housing and includes a first receiver and a second receiver.

6. The power source of claim 5, wherein the first receiver is oriented in a different direction than the second receiver.

7. The power source of claim 5 wherein the identification assembly includes a first sensor associated with the first receiver and a second identification sensor associated with the second receiver, wherein the first receiver conforms to a first battery profile and the second receiver conforms to a second battery profile, wherein the auxiliary power source is a battery having a profile that fits in one the first and second receivers, wherein upon fitment of the battery within the appropriate first or second receiver, the identification assembly identifies a type of battery to the power controller based on activation of the first sensor or second sensor.

8. The power source of claim 1, wherein the modular connector is formed on a wall of the housing and includes a connector that mates with a corresponding connector on the auxiliary power source;

wherein the auxiliary power source is attached to the housing such that the auxiliary power source moves with the housing as a unit; and wherein the connectors each have a power lead and a sense lead that conductively engage each other upon attachment of the auxiliary power source to the housing.

9. The power source of claim 8 further comprising a second auxiliary power source attachable to at least one of the housing and the auxiliary power source so that the housing, auxiliary power source and second auxiliary power source move as a unit; and a second modular connector adapted to electrically connect to a second auxiliary power source to the power controller, the second modular connector also including an identification assembly adapted to transmit identifying information about the second auxiliary power source to the power controller.

10. The power source of claim 1, wherein the auxiliary power source is attached to the housing by a fastener.

11. A power source comprising:
a controller that is electrically connected to an engine component that generates electrical power;
a modular connector that electrically connects the controller to an auxiliary power component;
wherein the controller combines the electrical power from the engine component and the auxiliary power component to provide a selected power output, wherein the selected power output is scalable by connecting at least one of plural types of auxiliary power sources within the auxiliary power component or connecting plural auxiliary power sources together within the auxiliary power component.

12. The power source of claim 11 further comprising an implement attached to the scalable power source, wherein the controller delivers the selected power output to the implement.

13. The power source of claim 12, wherein the implement is selected from the group consisting of a welding torch, a plasma cutter, a soldering iron, a brazing torch, an ultrasonic machining tool, and a laser.

14. A power source comprising:
an engine component adapted to generate electrical power;
an auxiliary power source;
a power controller electrically connected to the engine component and the auxiliary power source, wherein the power controller receives electrical power from at least one of the engine component or the auxiliary power source and controls the electrical power from the engine component or the auxiliary power source to generate a selected electrical current or voltage output;
a modular connector including a power connection adapted to transmit electrical power from the auxiliary power source to the power controller; and
an identification assembly adapted to provide identification information from the auxiliary power source to the power controller.

15. The power source of claim 14, wherein the power controller varies operating characteristics of the power source based on the identification information to maximize at least one performance characteristic of the power source.

16. The power source of claim 14, further comprising a housing encompassing the engine component and the power controller, wherein the modular connector is formed on a wall of the housing and includes a connector that mates with a corresponding connector on the auxiliary power source.

17. The power source of claim 16, wherein the auxiliary power source is attached to the housing such that the auxiliary power source moves with the housing as a unit.

18. The power source of claim 17, wherein the connector and the corresponding connector each have a power lead and a sense lead that conductively engage each other upon attachment of the auxiliary power source to the housing.

19. The power source of claim 14, further comprising a housing encompassing the engine component, the power controller, and the modular connector, wherein the modular connector includes a first receiver and a second receiver.

20. The power source of claim 19, wherein the identification assembly includes a first sensor associated with the first receiver and a second sensor associated with the second receiver, wherein the first receiver conforms to a first battery profile and the second receiver conforms to a second battery profile, wherein the auxiliary power source is a battery having a profile that fits in one the first or second receivers, wherein upon insertion of the battery within the one of the first or second receiver, the identification assembly identifies a type of battery for the power controller based on activation of the first sensor or second sensor.

* * * * *